(12) United States Patent
Wilbrink et al.

(10) Patent No.: US 7,071,924 B2
(45) Date of Patent: Jul. 4, 2006

(54) USER INPUT METHOD AND APPARATUS FOR HANDHELD COMPUTERS

(75) Inventors: Tijs Wilbrink, Leiden (NL); Edward E. Kelley, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 285 days.

(21) Appl. No.: 10/045,484

(22) Filed: Jan. 10, 2002

(65) Prior Publication Data

US 2003/0128190 A1 Jul. 10, 2003

(51) Int. Cl.
*G09G 5/00* (2006.01)

(52) U.S. Cl. .................. 345/168; 345/156; 345/773
(58) Field of Classification Search ......... 345/156–158, 345/163, 170, 168–178, 173, 175, 771, 773; 361/680, 681, 686
See application file for complete search history.

(56) References Cited

U.S. PATENT DOCUMENTS

| 6,108,200 | A | 8/2000 | Fullerton |
| 6,111,527 | A | 8/2000 | Susel |
| 6,232,960 | B1 * | 5/2001 | Goldman .................. 345/168 |
| 6,266,048 | B1 | 7/2001 | Carau, Sr. |
| 6,611,252 | B1 * | 8/2003 | DuFaux .................... 345/168 |
| 6,614,422 | B1 * | 9/2003 | Rafii et al. ............... 345/168 |
| 2001/0035858 | A1 * | 11/2001 | Blumberg ................. 345/168 |
| 2002/0021287 | A1 * | 2/2002 | Tomasi et al. ............ 345/168 |
| 2002/0061217 | A1 * | 5/2002 | Hillman et al. ........... 400/489 |
| 2002/0075240 | A1 * | 6/2002 | Lieberman et al. ....... 345/170 |
| 2003/0011576 | A1 * | 1/2003 | Sandbach et al. ........ 345/173 |
| 2003/0021032 | A1 * | 1/2003 | Bamji et al. ............. 359/568 |
| 2003/0132921 | A1 * | 7/2003 | Torunoglu et al. ....... 345/173 |
| 2003/0132950 | A1 * | 7/2003 | Surucu et al. ........... 345/700 |
| 2003/0137494 | A1 * | 7/2003 | Tulbert .................... 345/173 |
| 2003/0165048 | A1 * | 9/2003 | Bamji et al. ............. 361/681 |

FOREIGN PATENT DOCUMENTS

| JP | 2-94863 | 4/1990 |
| JP | 11-295813 | 10/1999 |
| WO | WO 00/07357 | 2/2000 |
| WO | WO 01/93006 A1 | 12/2001 |
| WO | WO 01/93182 A1 | 12/2001 |
| WO | WO 00/21024 | 4/2002 |

OTHER PUBLICATIONS

"The Acceleration Sensing Glove," http://bsac.eecs.berkeley.edu/~shollar/fingeracc.html, pp. 1–3, last updated Oct. 29, 2001.

* cited by examiner

*Primary Examiner*—Ricardo Osorio
(74) *Attorney, Agent, or Firm*—Scully, Scott, Murphy & Presser; Jay H. Anderson, Esq.

(57) ABSTRACT

A system and method for providing input to a handheld computing device by provisioning the handheld computing device with a projecting device a projecting device for displaying a graphical representation of a keyboard, the graphical representation including key locations capable of being selected by an object, the graphical image displayed in an area proximate the device; a signal detection system for detecting the presence of an object located at a selected key location within the area; and, a mechanism for determining the selected key in response to detecting an object at a corresponding selected key location and registering the selected key as a keystroke in the computing device.

19 Claims, 10 Drawing Sheets

100 ↘

| Distance / Iteration | 2 | 3 | 4 |
|---|---|---|---|
| 24 - 24, 1 | F | F | G |
| 24,1 - 24,2 | F | F | G |
| 24,3 ... | ... |  | G |

FIGURE 7(c)

| Distance / Iteration | 2 | 3 | 4 |
|---|---|---|---|
| 24 - 24, 1 | 0 | 0 | 1 |
| 24,1 - 24,2 | 0 | 0 | 1 |
| 24,3 ... | 0 | 0 | 1 |

Sweep (-)

Sweep (-)

FIGURE 7(e)

USER INPUT METHOD AND APPARATUS FOR HANDHELD COMPUTERS

BACKGROUND OF THE INVENTION

1. Field of the Invention

The present invention generally relates to the field of user input devices for computers; more particularly, to user input devices for computers comprising a projected keyboard and apparatus for detecting user input using electromagnetic signals.

2. Description of the Prior Art

In recent years, the size of portable computers have significantly decreased from the original laptop design, to the handheld and sub-notebook computers. Hand-held computers and sub-notebook computers are smaller computers with a laptop type configuration. Even though handheld and sub-notebook computers that use keyboards are small (e.g., About 3.5"×7"×1" for handheld, and about 4.5"×8"×1.5" for sub-notebook computers), they provide essentially the same functionality of larger computers. For instance, handheld and sub-notebook computers run productivity software including word processors, spreadsheets, fax, email, etc, and can communicate and replicate information with other computers using wireless or wired connections. Because of the rapid advancement of computer technology, the capabilities of these smaller computers are constantly increasing. However, there are problems associated with these smaller computers that have been hindering their effectiveness in spite of increasing processing power and an expanding selection of productivity software.

First, regardless of the capability of the hardware and the availability of software for these small computers, their functionality is constrained because they have keyboards that are too small to use effectively and comfortably. In order to use the available productivity software, full keyboard function is essential. Therefore, manufacturers have been attempting to integrate full physical keyboards into the footprint area of these small computers. Typically, this means that the keys are small, closely spaced, and some single-key functions are accessed through complex key combinations. Resulting layouts are packed with too many keys that are too cramped to allow adequate keyboard input. Not only are these keyboards tedious to use, they are a bottleneck and pose a significant barrier to attaining the potential functionality for handhelds and sub-notebooks that manufacturers are trying to provide and that consumers want. As miniaturization and processors continue to improve, ease of input and effective display area will be increasingly critical factors constraining the use and functionality of handheld and sub-notebook computers.

There have been varying efforts to address these problems. For instance, U.S. Pat. Nos. 5,687,058; 5,187,644; 5,267,127; 5,543,787; 5,706,167; 5,644,338; 6,111,527 disclose physical apparatuses in varying dimensions enabling for easier transportation and storage. Some of these patented keyboard designs are foldable in order to reduce dimensionality, however, result in a bulkier design and lack functionality until the keyboard is unfolded.

Different standards for keyboard layout are another constraint of physical keyboards. For instance, computer users requiring Chinese characters may prefer a smaller keyboard, using only 24 keys. Alternately, users working with a standard layout, such as the QWERTY keyboard layout, want to switch to another standard layout, such as the Dvorak keyboard layout, to increase typing efficiency. When working on a spreadsheet, users will prefer to have a numerical keypad available.

Thus, it is the case that the layout of the keyboard needs to change in the amount and location of the keys, as well as the image on the keys which refers to the action initiated by pressing the key. Unfortunately, conventional techniques for changing keycaps, such as described in U.S. Pat. No. 5,387,042 for a Multilingual Keyboard System, or W.O. Patent 26759, change only the image on the keys without providing the option to change the number or location of these keys. For instance, children might benefit from a simplified keyboard with large keys. Users working with a numerical keypad for a longer period will have an ergonomical need to change the position of the keys on the keyboard, to alternate their movements and position.

Many companies are currently considering options for these input devices. One solution in the art for inputting characters to small computing devices include the use of a virtual reality glove which incorporates an RF transmitter for wireless input. For instance, as described at http://bsac.eecs.berkeley.edu/~shollar/fingeracc/fingeracc.html, an acceleration sensing glove equipped with accelerometers placed at each finger may be used to interpret hand/finger gestures representing characters or symbols that may be interpreted by a computer and generate signals for wireless transmission to a computing device. While a viable solution, it requires the user to be fitted with the glove and become familiar with all of the numerous hand gestures representing the characters.

Furthermore, technology described at http://www.ad.nl/artikelen/InternetenPc/1007014756653.html enables users of personal digital assistants (i.e., Palm) to type in front of the computing device, without a physical keyboard as such being available. The result is achieved by two devices being mounted on the user's hands that detect finger movement by rubber extensions. One disadvantage of this system is that the user has to type blind, i.e., the user does not have a view of the keyboard at the place where the user types. The signal from the rubber extensions is translated into position and sent wireless (e.g., by using Bluetooth technology) to the computing device. This technology still uses devices outside of the computing device itself, the position of the pressed key being detected physically with rubber extensions with no image of the keyboard being displayed.

Thus, there is a need in the art for a customizable keyboard assembly for handheld and sub-notebook computers, which provides the effectiveness and comfort of a full-size keyboard without significantly affecting the size or weight of the computer.

SUMMARY OF THE INVENTION

It is therefore an object of the present invention to provide for handheld computing devices, a method and apparatus for projecting a customizable graphical image of a keyboard device and enabling user input of keys by detecting objects at locations in the image corresponding to the keys.

A further object is to provide for handheld computing devices, a system and method for customizing a virtual keyboard according to user preferences.

It is another object of the present invention to provide for handheld computing devices, a method and apparatus for projecting a displayed screen image and enabling user input and/or selection of items from said projected screen image by detecting objects at selected locations in the image.

It is another object of the present invention to provide for handheld computing devices, a method and apparatus for projecting a displayed screen image and enabling user input and/or selection of items from said projected screen image by detecting a user's finger placed at selected locations in the image.

Thus, according to one aspect of the invention, there is provided a computer device comprising: a projecting device for displaying a graphical representation of a keyboard, the graphical representation including key locations capable of being selected by an object; a signal detection system for detecting the presence of an object located at a selected key location; and, mechanism for determining the selected key in response to detecting an object at the corresponding selected key location.

In a further aspect of the invention, there is provided a computer device comprising: a projecting device for displaying one of: a screen image or portion of a screen image display, the screen image including displayed items capable of being selected by an object; a signal detection system for detecting the presence of an object located at a selected item location; and, mechanism for determining the selected item in response to detecting an object at a corresponding selected key location.

Preferably, the method and apparatus using a projected keyboard and signal detection for detecting keystrokes implements radar technology; however, other technologies, e.g., use of optical or laser signals and photodetector devices, may be implemented.

According to another aspect of the invention, there is provided a method for providing input to a computer device comprising the steps of: displaying a graphical representation of a keyboard image, the graphical representation including key locations capable of being selected by an object, the graphical image displayed in a limited area proximate the device; detecting the presence of an object located at a selected key location; and, determining the selected key in response to detecting an object at a corresponding selected key location.

The system and method of the present invention provides the following advantages: 1) as the projected keyboard is non-physical, it does not have to be moved when moving the computing device; 2) changing the keyboard graphics is relatively easy and one device will support multiple keyboard standards, as well as for disabled users, and other usages of the keyboard, like numerical input; and, 3) the user of the computing device does not have to carry a relatively large keyboard in addition to that user's computing device. The present invention additionally may be implemented in computing devices such as GSM, PDA, Notebook, GPS, etc.

BRIEF DESCRIPTION OF THE DRAWINGS

Further features, aspects and advantages of the apparatus and methods of the present invention will become better understood with regard to the following description, appended claims, and the accompanying drawings where:

FIGS. 7(a)–7(e) depict how the virtual keyboard 40 may be represented in the computer system in terms of a defined coordinate system and the mechanism by which keystroke detection occurs;

DETAILED DESCRIPTION OF PREFERRED EMBODIMENTS

The present invention is directed to a handheld computing device implementing a projecting device for displaying a keyboard, and a sensing device for detecting the location of objects within a field surrounding the handheld computer. Generally, the computing device includes a projector device functioning to project an image of the keyboard on, for instance, the platform or table supporting the computer device, and a location sensor device for detecting the current location of the user's finger in the area registered above the location of the pressed key in the system.

Figure 1:
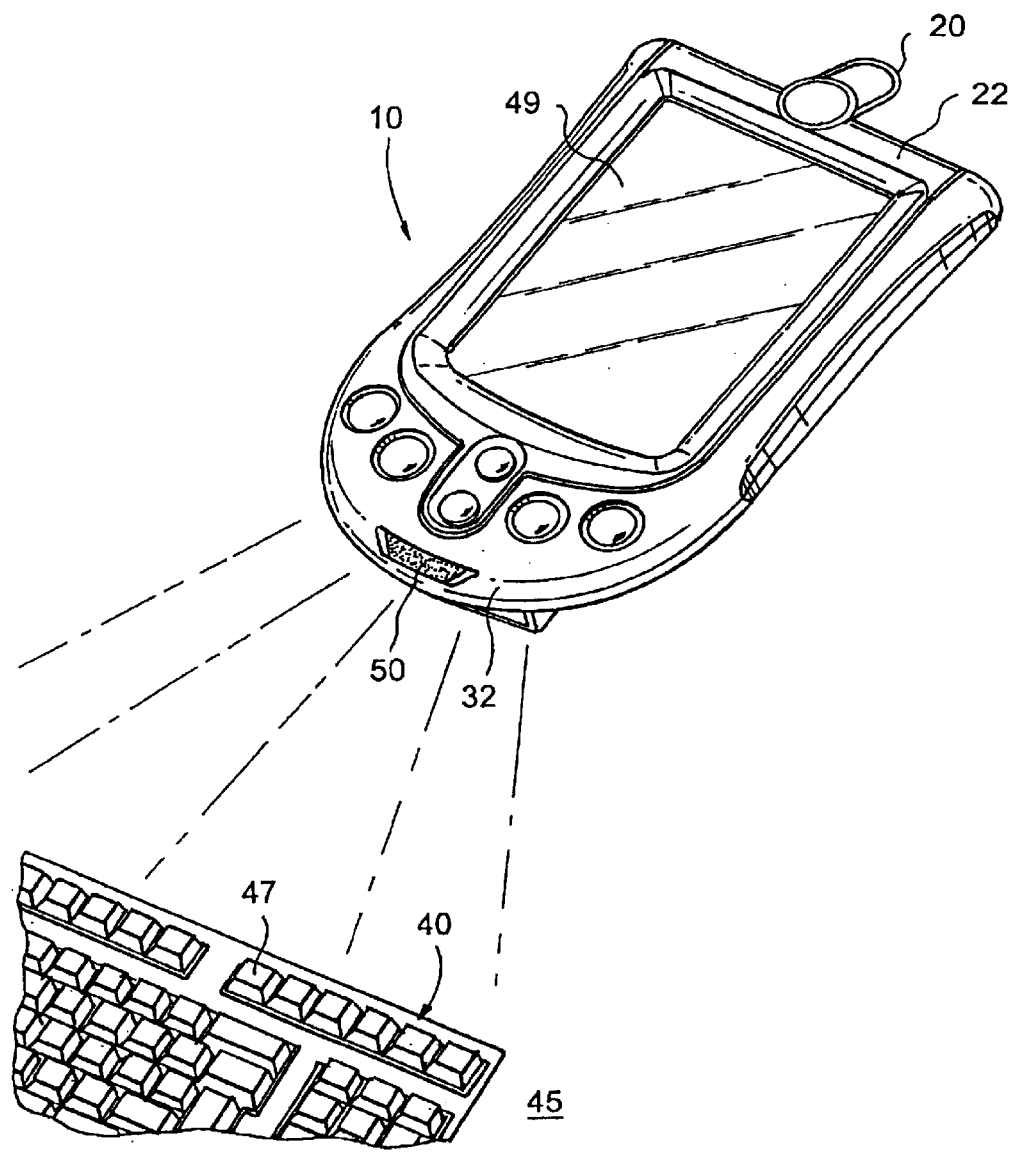
FIG. 1 illustrates a handheld computing device with a keyboard projecting device displaying a keyboard and a radar device for detecting the location of objects within a field surrounding the handheld computer.

FIG. 1 illustrates a handheld computing device 10 including a projecting device 20 that is enabled to display an optical image or graphical representation 40 of a keyboard (hereinafter "virtual" keyboard) and define a virtual keyboard space including locations 47 representing the keys and associated functionality of a conventional keyboard device; and, a radar device 50 capable of detecting the location of objects within a field surrounding the handheld computer 10. As shown in FIG. 1, the projecting device 20 is suitably mounted at a top portion 22 of the computing device 10 and includes suitable electronics for converting an electronic representation of the keyboard to the optical image representation 40. Preferably, the image of the keyboard is either stored as a graphical image or constructed based on the field definitions of the user. As the key definitions are implemented in software, changing the keyboard graphics is relatively easy and one device will support multiple keyboard standards, types as well as provide for other usages of the keyboard. Preferably, the virtual keyboard image 40 may be displayed on a pre-defined area of a table, flat screen, or supporting apparatus 45 in front of the computing device 10, for example, where a physical keyboard may be located. Additionally, the scale of the virtual keyboard image may be defined by the user, as the only constraint is the range of the radar and the resolution in which reflected signals in the virtual keyboard space may be detected. However, the standard size may be the size of a conventional keyboard. It should be understood that the system of the invention is not restricted to just keyboard input.

As further shown in FIG. 1, the radar device 50 is positioned at an opposite end 32 of the device beneath the screen display portion 49 of the computing device, and includes a transmit antenna device for emanating electromagnetic signals used for sensing objects within a restricted range above an area corresponding to the area defined by the projected graphical representation of the keyboard 40, and a receive antenna for detecting objects in the restricted range. It should be understood that the radar device does not necessarily have to be placed at an opposite end of the computing device. Moreover, there may be multiple devices such as will be described herein with respect to FIG. 5. In one embodiment, the sensing device is aimed just above the table enabling sensing of objects a predetermined distance, e.g., approximately 0.5 inches, above the virtual keyboard. The transmitted signal is the actual radar signal, comprising radio waves sent out by the transmit antenna. In one embodiment, the radar is sending out these radio signals in different directions in accordance with a timing signal that triggers the sending of the signal, as will be explained in greater detail herein. All these directions are covered within a set time, resulting in multiple sweeps per unit time, i.e., a sweep frequency. Typically, this sweep frequency is dependent on the required resolution and the sweep area in which objects need to be detected. As the keyboard is close to the transmitting antenna, and radio waves travel at the speed of light, the time required to detect objects in one direction is short, and enables for many sweeps and a high resolution.

Figure 2:
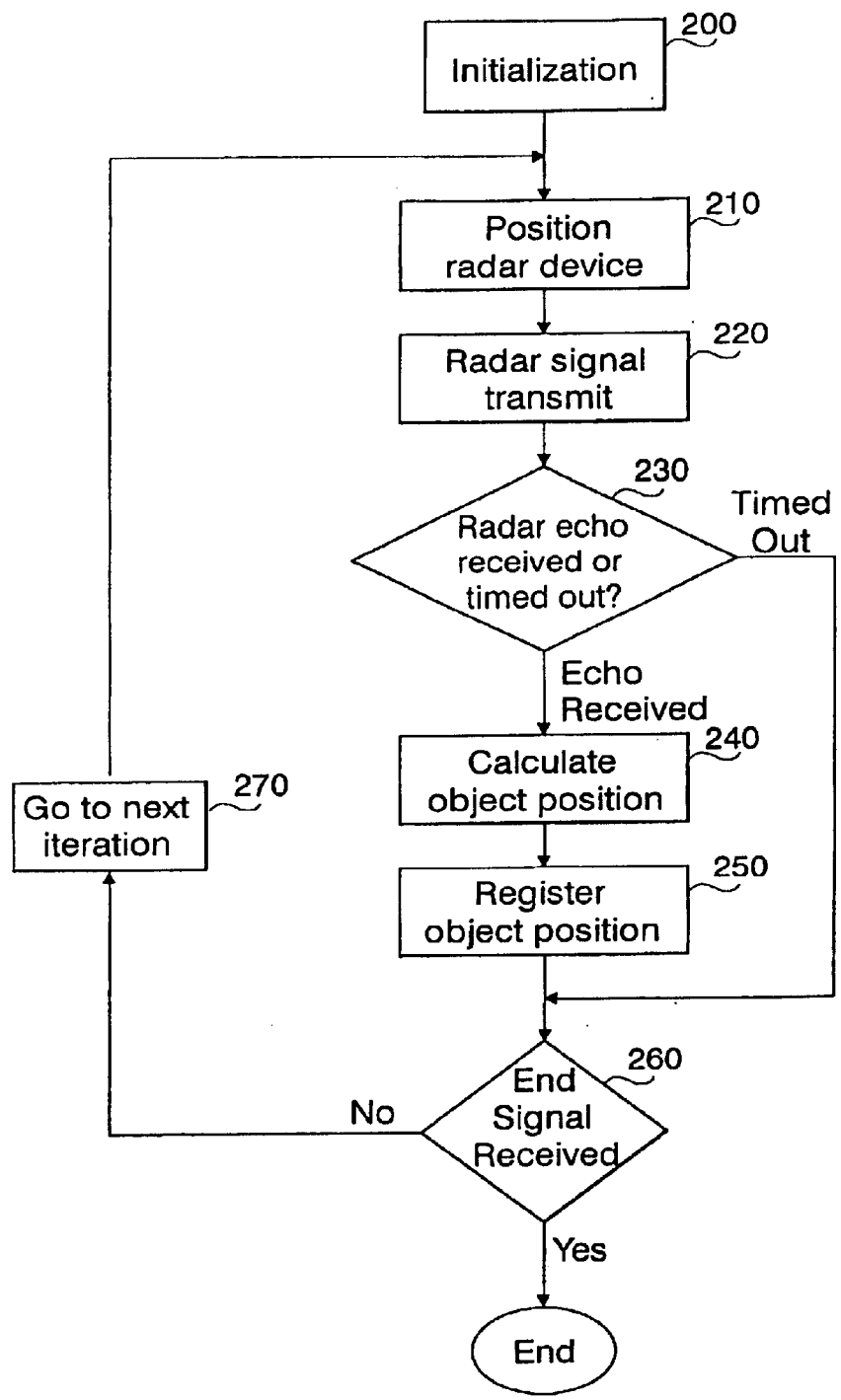
FIG. 2 is the general flow chart describing the method steps performed by the projected keyboard system of the present invention.

FIG. 2 is a flow chart describing generally the method steps performed by the projected keyboard system of the present invention. The sequence of events starts at step 200 with an initialization routine enabling the projector to display the graphical keyboard image 40 in a manner suitable for the intended user. Then, as indicated at step 210, a step for positioning the radar device to generate a sweep range restricted by the dimensions of the projected keyboard image 40 is performed as will be described in greater detail with respect to FIGS. 8 and 9. Then, at step 220, after positioning the radar device to thereby restrict its sweep range, radar transmit timing signal pulses are initiated and the sequence of electromagnetic radar signals are generated for transmission via the radar transmit antenna. Preferably, the sequence of electromagnetic pulses are generated in response to a transmit timing signal which may comprise a 100 picosecond pulse to a resistively loaded, cavity backed, monopole antenna. The range delay path includes an exponential voltage ramp circuit, providing a real time range sweep circuit range, for example, a 0 to 10 nanosecond sweep range. The range is swept at more than 10 Hertz.

Figure 6A:
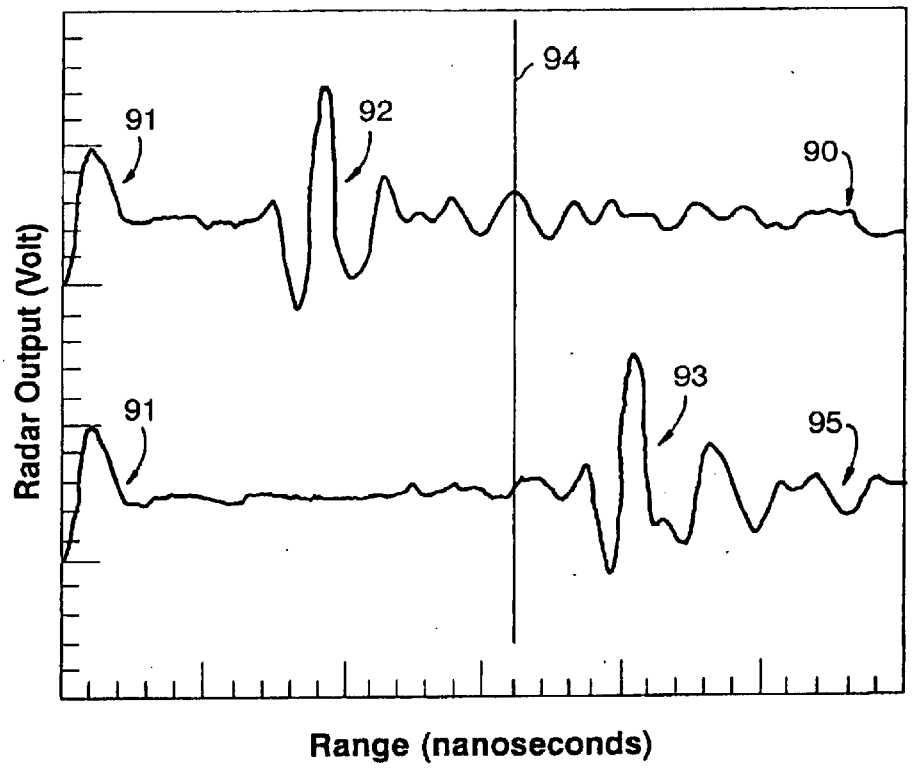
FIG. 6(a) illustrates example radar signal output response versus time for each of two radar signal sweeps in the radar system of FIG. 1.
Figure 6B:
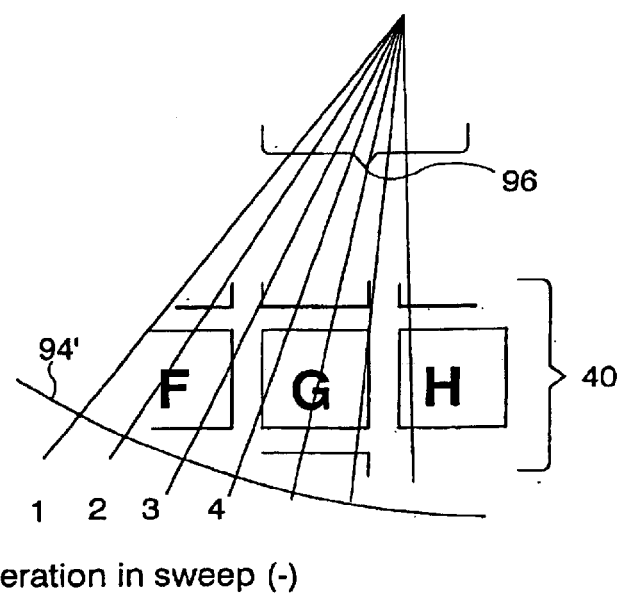
FIG. 6(b) illustrates the range keyboard range limitation enabling registration of valid and invalid keystrokes (radar echo responses)

The electromagnetic pulses generated by the radar transmit antenna device are configured to echo off an object or target within the field of the sensor 50 and are received by the receive antenna device. As indicated in FIG. 2 at step 230, a determination is made as to whether the radar echo is received or timed out. If an echo signal is not received, the process proceeds to step 260 to determine whether an end signal has been received (time out) indicating end of the current user section. If the end signal has been received, the process ends. However, if the end signal is not received, then the process will repeat for the next radar sweep at step 270 and the process returns to step 220. Returning to step 230, if it is determined that the radar echo was received, then the process proceeds to step 240 to calculate the object's position. In the preferred embodiment, the elapsed time between transmission of the signal and receipt of the corresponding echo is used to measure the distance to the object, hereinafter referred to as distance "z", and provides details on the location of the object on the keyboard. As will be explained in greater detail, the distance "z" is determined as the time elapsed between transmission and receipt of the radar echo multiplied by ½ the radar speed (i.e., z=time*(speed of radar/2)). A detected keystroke on the defined key at the identified location is finally registered by the computer system as indicated at step 250. Preferably, the user is notified of a key being pressed by a change in color or dimension of the virtual key 47 (FIG. 1). FIG. 6(a) particularly illustrates an example radar signal output response versus time for each of two radar signal sweeps in the radar system of FIG. 1. Two traces are illustrated, a first trace 90 resulting from a radar echo at a location of 30 cm, and a second trace 95 resulting from a radar echo at 60 cm. The signals include an initial pulse 91 which corresponds to a main lobe signal resulting from the transmit timing (sweep) pulse. In the first echo trace 90, a pulse 92 is generated from an object located at about 30 cm. In trace 95, a pulse 93 is generated from an object at about 60 cm. In the example depicted in FIG. 6(a), it is assumed that background noise is about 30 dB lower than the strong return echo from the object within the range. The line 94 indicates the limit of the detected range when using the keyboard system of the present invention. That is, as shown in FIG. 6(b), any radar echo received in time corresponding to a distance beyond range limit 94' (corresponding to 94 in FIG. 6(a)) are ignored as being outside of the virtual keyboard. As will be described in greater detail, iterations 96 of the radar signal cover detection of objects on the keyboard.

Figure 5:
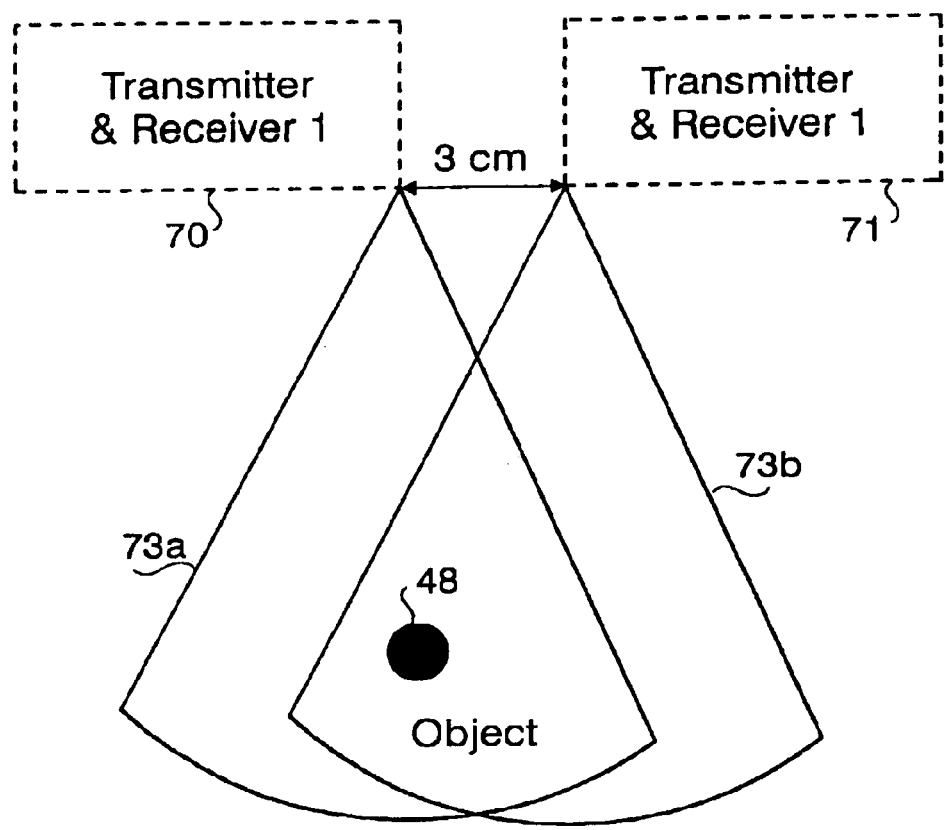
FIG. 5 depicts a second approach for determining the virtual key pressed from received echo pulses that implements two transmit and receive antenna pairs.

It should be understood that, during all radar sweeps, if an echo signal at one specific location is received at similar strength and timing, there is considered to be an interfering object in the range of the detected field. The presence of this object will be registered in the system, preventing resulting key presses from being registered. The projected keyboard may highlight the area in which the noise is located, to indicate the user of the presence of an object disturbing the radar detection. As the interfering object may not cover the whole radar signal, detection of virtual keys on and behind its location might still be possible and changes in strength or timing of the echo signal are interpreted as a keystroke. The embodiment depicted in FIG. 5 showing two transmit/receive devices reduces the impact of an interfering object in the detected range.

Figure 7A:
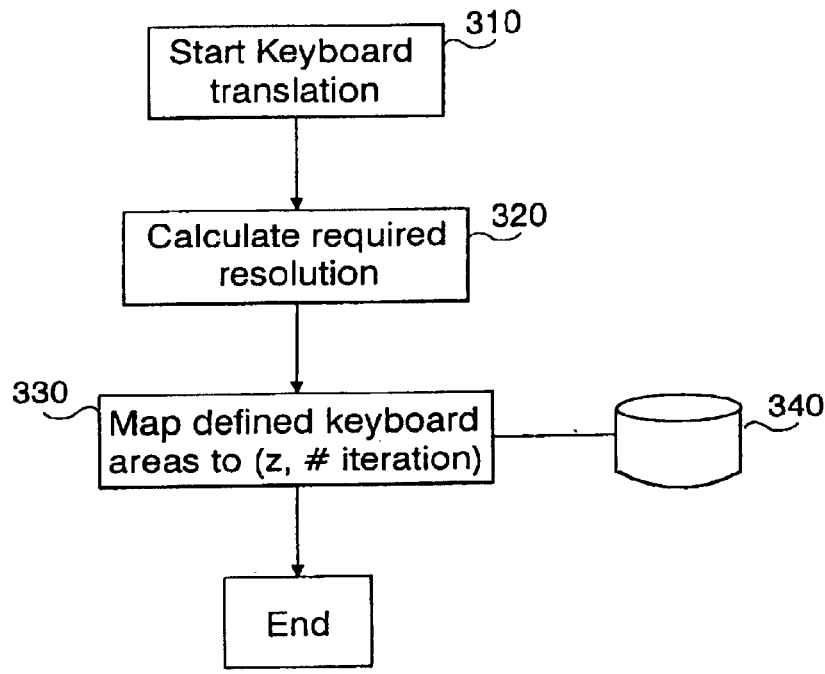
Figure 7B:
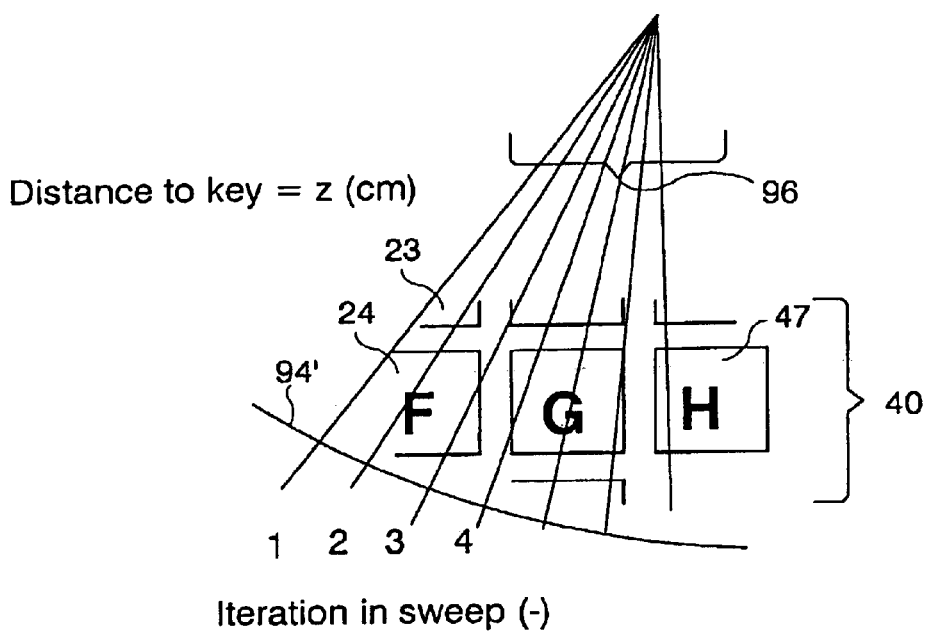

FIGS. 7(a)–7(e) depict how the virtual keyboard 40 may be represented in the computer system in terms of a defined coordinate system based on either the distance from a center point and angle, i.e., location of the iteration within a sweep movement. For instance, FIG. 7(a) illustrates the method 310 for initializing the translation system. The keyboard translation steps includes: calculating a required resolution for the system at step 320; mapping defined keyboard areas to the distance "z" (distance from a key to the radar signal detector) and number iteration at step 330 and, saving the mapping results to memory storage 340 included with the computer system. The sections comprising the virtual keyboard are mapped to this coordinate system, as illustrated in FIG. 7(b). As the detection of an object takes place on the object side nearest to the radar device, a point 24 on the key section nearest to the radar signal is defined on the section border, and a bottom point 23 on the key section is defined slightly above the section border, for example. Thus, when pressing a virtual key with a finger, for instance, the radar signal will bounce on the user's fingernail, which is located on top of the key section. This keyboard definition mapping is stored in the database 340 in the manner as shown in FIG. 7(c), which illustrates a table plotting the keyboard keys 47 as a function of distance 97 per iteration (radar signal sweep) 96. In general, the keystroke registration process on the defined key at the identified location (depicted at step 240, FIG. 2) requires the calculated distance "z" and the current radar sweep iteration number. As depicted in the example of FIG. 7(d), a keystroke corresponding to the letter "G" will be registered at detection of an object (e.g., finger) located approximately 24 cm (z=24 cm) from the radar device in the fourth iteration in the radar sweep. When such a sweep covers one key multiple times, the combination of positive feedback indicates a key being pressed such as indicated by the plurality of 1's 99 in FIG. 7(*d*). To prevent a moving finger within the radar range to be mistaken for a pressed key, the detection 99 may be spread over multiple sweeps 96 as depicted in FIG. 7(*e*).

Figure 3:
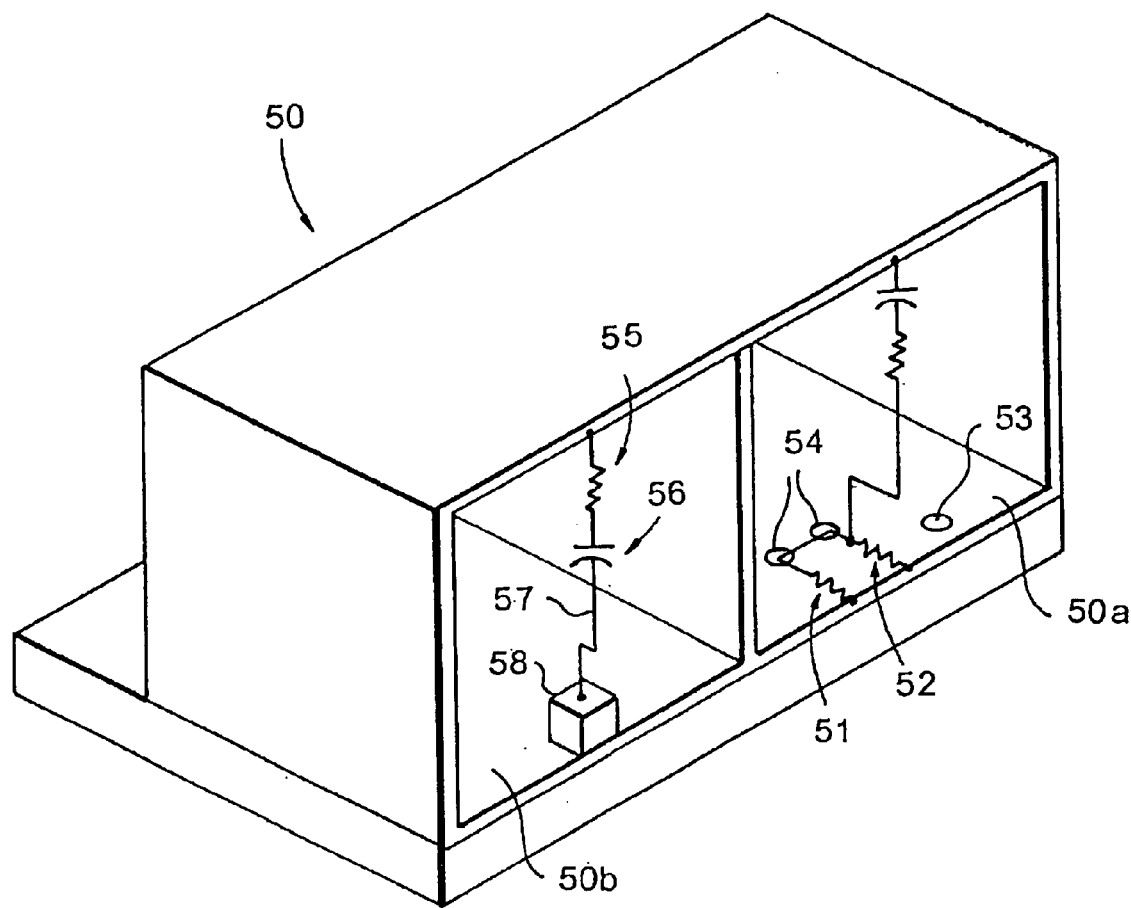
FIG. 3 illustrates the functional antenna configuration and waveguide cavities according to one of the embodiments of the present invention.

Referring now to FIG. 3, the radar sensor device 50 implemented in the handheld computing device with a keyboard projecting device 10 of the invention, includes a one-quarter inch monopole antenna for the transmitter 57, and a one-quarter inch monopole antenna 54 for the receiver. The transmit antenna is used to transmit a sequence of electromagnetic pulses with the echoes received by a receive antenna portion. More particularly, FIG. 3 illustrates an exemplary radar system 50 that may be implemented in the computing device. The radar system 50 generally includes a receive portion 50*a* including a monopole antenna element 54 having a load resistor and load capacitor within the receive cavity. Resistors 51, 52 are provided between ground and sample gates used for input of the received signal. These gates connect the antenna system to the processing system electronics of the computer device (not shown) via a gap 53 such as shown in FIG. 3. Likewise, on the radar signal transmit side 50*b*, transmit antenna 57 is connected to a transmit load resistor 55 and capacitor 56. The transmit portion 50*b* further includes pulse generator device 58 for transmitting radar signals via the transmit antenna 57.

Figure 4A:
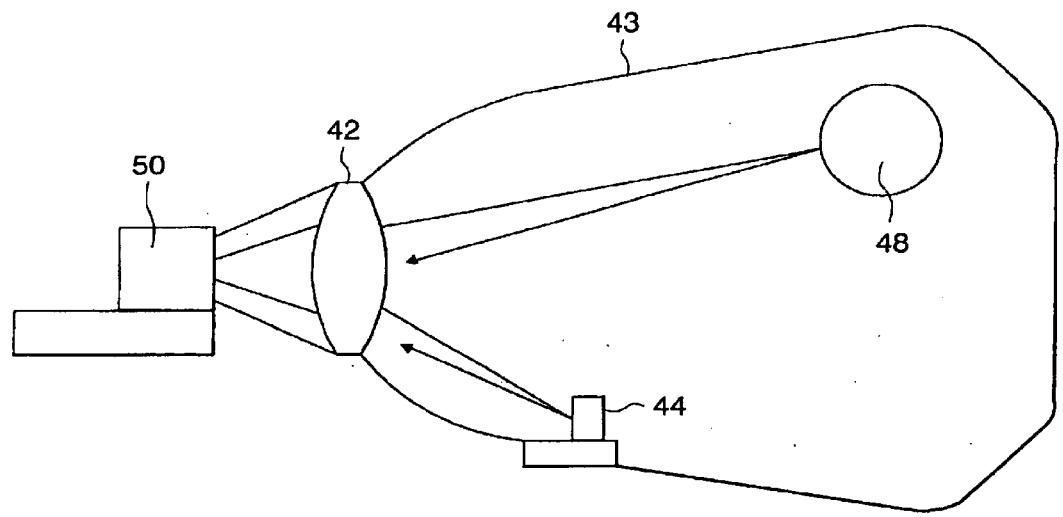
FIGS. 4(a) and 4(b) depict a general schematic diagram illustrating use of a dielectric lens (FIG. 4(a)) and a directional horn (FIG. 4(b)) with the transmitter of the present invention.
Figure 4B:
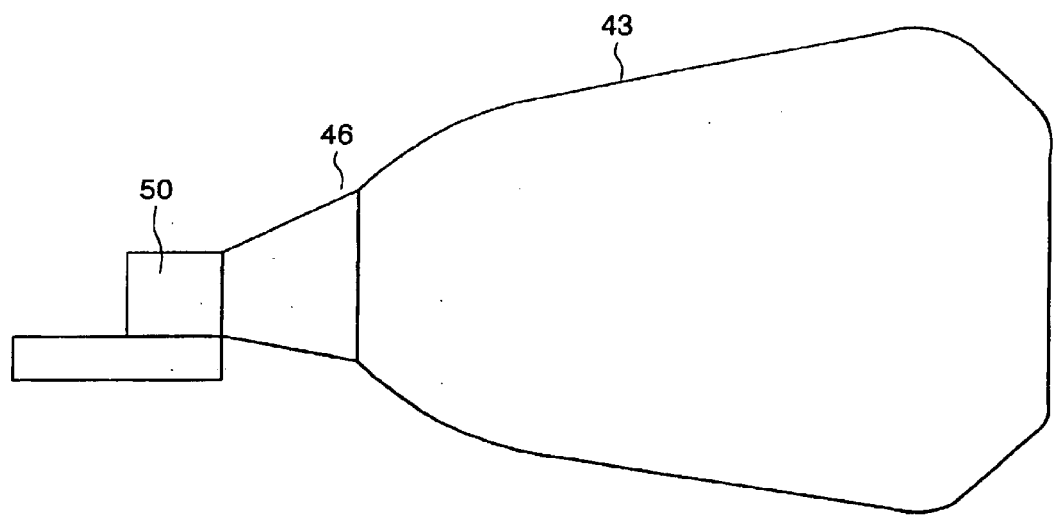

FIG. 4(*a*) illustrates use of a dielectric lens 42 with the transmitter, which creates a directional lobe 43, for improving the sensitivity and directional control of the radar 50. This dielectric lens 42 is positioned in front of the transmit and receive antennae of the radar device and particularly functions to provide a radar signal 43 having a beam width sufficiently narrow to determine the key upon the displayed virtual keyboard which is touched by the user. As would be known to skilled artisans, a calibration device 44 may be provided for calibrating the radar system. In an alternative embodiment, illustrated in FIG. 4(*b*), a directional horn 46 may be used to direct the radar beam.

While a radar sensing system is being described for exemplary purposes, it should be understood that, according to the invention, other types of sensor devices might be used as well. For instance the sensing system may comprise a laser signal generator and photodetector devices. In a preferred embodiment, radar or laser sensing is implemented in that the analysis of the returned signal is very straightforward. Particularly, a strong returned signal means a nearby object 48 has reflected the transmitted signal, and the time elapsed between the transmitted signal and receipt of a received signal from the object is used to determine the distance of the object. For example, as described herein with respect to FIG. 6, echo signals from previous sweeps are 30 dB weaker than the received "main lobe" echo within a range of 60 cm, for example, enabling subtraction of the echo signal. Using the radar construction as depicted in FIG. 3, a resolution of 1 picosecond, equivalent to 0.01 inches, may be achieved.

It should be understood that in the first approach the virtual key pressed may be determined from received echo pulses using a radar (or laser beam). This approach requires one radar (or laser) with different sweeps (as described before), aimed in one direction and a unit to receive the signal. As the beam or radar sweep signal is covering a very restricted area, the distance is sufficient to determine the key which is pressed. For example, one beam or signal may cover virtual keys such as 7, U, J and M in a QWERTY-type virtual keyboard, while another beam may cover virtual keys such as 6, Y, H and N.

In a second approach, the system may be provisioned with detection devices capable of determining the virtual key pressed from received echo pulses without the need for sweeping the radar (or laser) signal. In this second approach, such as depicted in FIG. 5, two transmit and receive antenna pairs 70, 71 respectively, each spaced apart a predetermined distance, e.g., three (3) centimeters, are implemented for determining the virtual key pressed. By receiving reflected (echo) signal information on an object 48 as a result of two reflected radar signals 73*a*, 73*b* within the detected range, the location of the object 48 may be determined by using the two variable distances.

Each of the first and second approaches may be further enabled by differentiation of the detected object by relative speed. The received echo from the radar signal 43 (or laser beam) will have a different frequency as the detected object 48 moves relative to the transmitting and receiving device, in accordance with a Doppler shift effect. It should be understood that this may be used for the keyboard as well; i.e., a moving fingertip in a non vertical direction is probably not meant to hit a key and thus can be ignored in the detection of user input.

Figure 8:
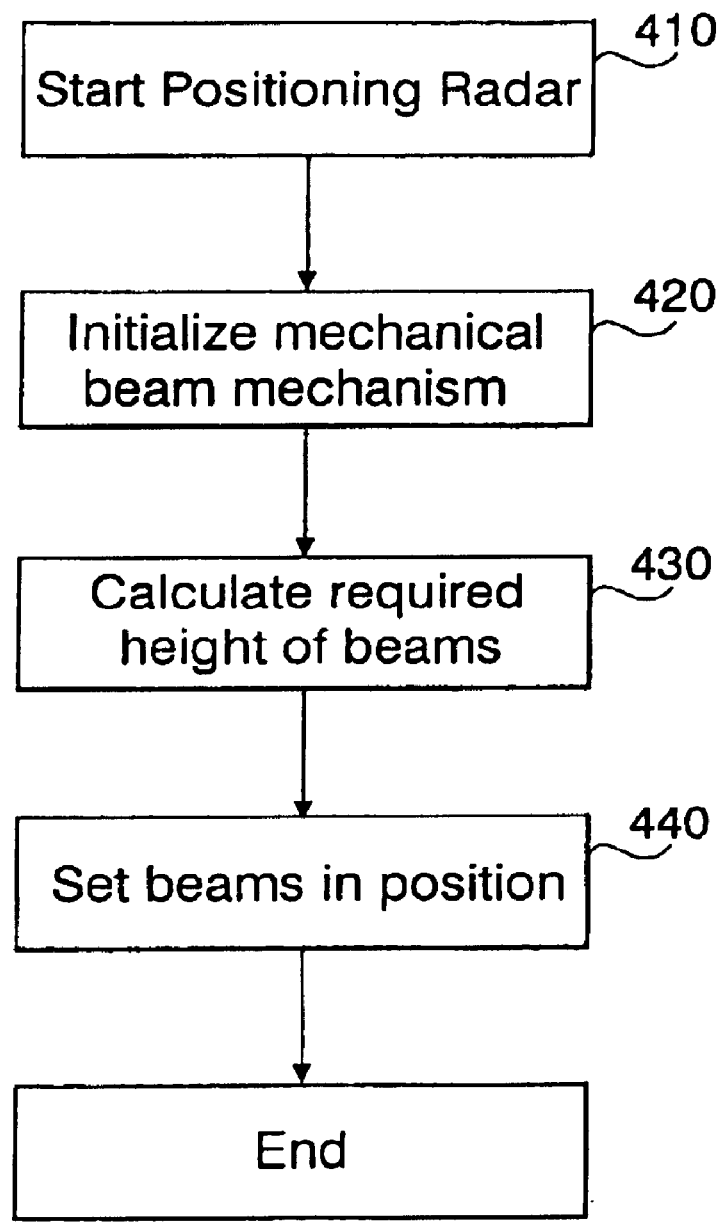
FIG. 8 is a flowchart depicting the manner for positioning the radar device as set forth at step 210, FIG. 2.

FIG. 8 is a flowchart depicting the manner for positioning the radar device as set forth at step 210, FIG. 2, and, particularly to enable setting of the radar field in terms of the height above the ground or the angle between the radar field and the support surface 45. The required height of the beams is dependent on the user preferences and may be easily calculated by skilled artisans. For instance, as shown in FIG. 8 at step 410, the positioning of the computing device, virtual keyboard is initialized according to the comfort of the user, as is the sweep mechanism for the radar transmitter as depicted at step 420. Then, at step 430, a calculation is performed to determine the required beam height according to the set user preferences, and accordingly, the beam height is set in position at step 440.

Figure 9:
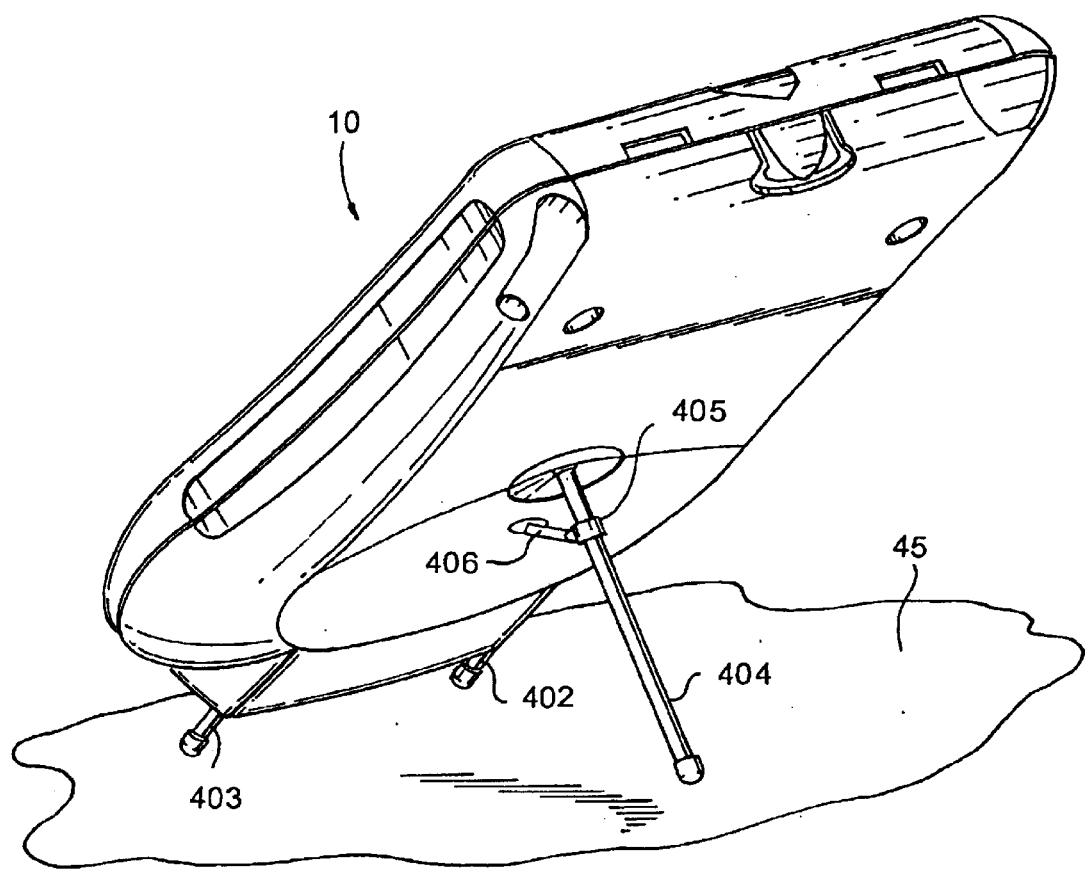
FIG. 9 is an exaggerated view of the a handheld computing device with a keyboard projecting device 10 being supported with positioning legs.

FIG. 9 is an exaggerated view of the computing device 10 being supported with legs 402–404 for stabilizing and positioning the projecting device and said radar device to ensure production of the radar fields at the desired beam heights. Support leg 404 serves to stabilize the construction, and to correct changes in height set by legs 403 and 402 and, additionally, to set the angle between the radar field and the support apparatus 45. Support leg 404 is controlled and set by leg 406, using a rotating ball and sliding ring 405 to set the angle and position of leg 404. Leg 404 is attached to the computing device with a construction enabling rotation in one direction and leg 406 is constructed only to move in or out the computing device.

It should be further understood that the concept of activating/deactivating the keyboard may be implemented. That is, one or more virtual keys may be armed for registration as part of the initialization process prior to using the virtual keyboard. For example: the left or right portion of the spacebar can serve such a function. Before the keyboard is armed, the user may rest his/her fingers on the virtual keys without registration, or, move his/her fingers and successfully touch any key except the armed key with no effect.

In another embodiment, the computer may be notified of a finger making contact with a projected key by using a virtual glove that is able to project the position of the fingers on the displayed keyboard. According to a further embodiment, a pressure sensitive device may be installed on each finger tip of the virtual glove that functions to notify the computer when a key has been selected. In an additional embodiment, the position of the finger indicated by the virtual glove is used to notify the computer which key has been selected. In this embodiment, the finger positioning is used in conjunction with pressing a key to activate the keyboard after each stroke.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

What is claimed is:

1. A computer device comprising:
   a projecting device for displaying a graphical representation of a keyboard, said graphical representation including key locations capable of being selected by an object, said graphical image displayed in an area proximate said device;
   mechanism for arming a selected key location prior to registering a keystroke corresponding to that selected, key location wherein an object may rest on any virtual key location except the armed key location without registration;
   a signal detection system for detecting the presence of an object located at a selected key location within said area, said signal detection system comprising a radar device adapted far detecting objects at locations within a limited range defined by said graphical representation; and,
   mechanism for determining the selected key in response to detecting an object at a corresponding selected armed key location and registering said selected key as a keystroke in said computing device.

2. The computer device according to claim 1, wherein said signal detection system includes a laser generator and photodetector device for detecting the location of objects within said limited range.

3. The computer device according to claim 1, wherein said signal detection system includes an electromagnetic signal transmitter means for iteratively transmitting series of electromagnetic signals sweeping said limited range, and receiving electromagnetic signal reflections from detected objects, wherein said electromagnetic signal transmitter means is located a predetermined distance away from said graphical representation.

4. The computer device according to claim 3, wherein said determining mechanism includes: means for calculating a distance between said electromagnetic signal transmitter means and said detected object; and means for determining a current iteration of said series of electromagnetic signals, wherein said key is determined according to said distance and said current iteration.

5. The computer device according to claim 3, wherein said means for calculating a distance between said electromagnetic signal transmitter means and said detected object includes means for determining an elapsed time between transmission of said electromagnetic signal and receipt of its corresponding reflected signal.

6. The computer device according to claim 3, further comprising memory means comprising a mapping of valid selectable key strokes according to calculated distances and electromagnetic signal pulse iteration.

7. The computer device according to claim 3, further comprising leg means for adjusting a vertical and angular orientation of said projecting and signals detection devices with respect to a surface, said adjusting mechanism for adjusting a range of said series of electromagnetic signals according to a projected display.

8. The computer device according to claim 3, further comprising means for customizing content of said virtual keys provided in the graphical representation of said keyboard.

9. The computer device according to claim 3, further comprising means for differentiating a detected object by relative speed of movement.

10. The computer device according to claim 1, wherein an object includes a finger of a user of said computer device.

11. A computer device comprising:
    a projecting device for displaying one of: a screen image or portion of a screen image display, said screen image including displayed items capable of being selected by an object;
    mechanism for arming a selected item location prior to registering an object as being detected at that selected item location, wherein an object may rest on any virtual item location except the armed item location without registration;
    a signal detection system for detecting the presence of an object located at a selected item location, said signal detection system comprising a radar device adapted for detecting objects at locations within a limited range defined by said screen image or screen image portion; and,
    mechanism for determining the selected item in response to detecting en object at a corresponding selected armed item location.

12. A method for providing input to a computer device comprising the steps of:
    a) displaying a graphical representation of a keyboard image, said graphical representation including key locations capable of being selected by an object, said graphical image displayed in a limited area proximate said device;
    b) implementing a radar device for iteratively transmitting series of electromagnetic signals for sweeping said limited area, a transmitter of said electromagnetic signals being provided at a limited distance away from said graphical representation;
    c) arming a selected key location prior to registering a keystroke corresponding to that selected key location, wherein an object may rest on any virtual key location except the armed key location without registration;
    d) receiving via a receiver device electromagnetic signal reflections from an object positioned within said limited area for detecting the presence of an object located at a selected key location; and,
    e) determining the selected key in response to detecting an object at a corresponding selected armed key location.

13. The method according to claim 12, wherein said selected key determining step comprises the steps of:
    calculating a distance between said electromagnetic signal transmitter and said detected object; and,
    determining a current iteration of said series of electromagnetic signals, wherein said key is determined according to said distance and said current iteration.

14. The method according to claim 13, wherein said calculating step includes the stop of determining an elapsed time between transmission of said electromagnetic signal and receipt of its corresponding reflected signal.

15. The method according to claim 13, further including the stop of: providing a mapping of valid selectable key strokes according to calculated distances and electromagnetic signal pulse iteration.

16. The method according to claim 12, wherein prior to iteratively transmitting series of electromagnetic signals for sweeping said limited area, the step of positioning the transmitter device to thereby restrict electromagnetic signal sweep range.

17. The method according to claim 12, wherein after determination step d), the step of registering said selected key as a keystroke in said computing device.

18. The method according to claim 12, wherein after determination step d), the step of notifying a user of a key being selected in said keyboard image, said notifying including one or more of: changing a color or dimension of the selected virtual key.

19. The method according to claim 12, further comprising the step of differentiating a detected object by relative speed of movement.

* * * * *